(12) United States Patent
Hong et al.

(10) Patent No.: US 8,582,603 B2
(45) Date of Patent: *Nov. 12, 2013

(54) METHOD AND APPARATUS FOR CONFIGURING PROTOCOL HEADER IN WIRELESS COMMUNICATION SYSTEM

(75) Inventors: Seung Eun Hong, Daejeon (KR); Kyeongpyo Kim, Daejeon (KR); Yong Sun Kim, Daejeon (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

This patent is subject to a terminal disclaimer.

(21) Appl. No.: 13/119,055

(22) PCT Filed: Sep. 16, 2009

(86) PCT No.: PCT/KR2009/005254
§ 371 (c)(1),
(2), (4) Date: Mar. 15, 2011

(87) PCT Pub. No.: WO2010/032950
PCT Pub. Date: Mar. 25, 2010

(65) Prior Publication Data
US 2011/0206066 A1    Aug. 25, 2011

(30) Foreign Application Priority Data

Sep. 17, 2008  (KR) .................. 10-2008-0091018
Sep. 23, 2008  (KR) .................. 10-2008-0093207
Sep. 25, 2008  (KR) .................. 10-2008-0094080
Aug. 17, 2009  (KR) .................. 10-2009-0075655

(51) Int. Cl.
*H04J 3/00*   (2006.01)

(52) U.S. Cl.
USPC ................. 370/474; 370/329; 370/349

(58) Field of Classification Search
USPC ....................... 370/329, 349, 474
See application file for complete search history.

(56) References Cited

U.S. PATENT DOCUMENTS

| | | | |
|---|---|---|---|
| 6,608,828 B1 * | 8/2003 | Balachandran | 370/349 |
| 7,551,581 B2 * | 6/2009 | Stephens et al. | 370/329 |
| 2005/0078598 A1 | 4/2005 | Batra et al. | |
| 2006/0023802 A1 | 2/2006 | Balakrishnan et al. | |
| 2006/0126847 A1 * | 6/2006 | Ho | 380/277 |
| 2009/0061784 A1 * | 3/2009 | Cordeiro | 455/68 |

FOREIGN PATENT DOCUMENTS

| | | |
|---|---|---|
| JP | 2003-509957 | 3/2003 |
| KR | 2008-0044321 A | 5/2008 |

OTHER PUBLICATIONS

Biri et al., Securing Media Hotspot, Apr. 24, 2008.*

(Continued)

*Primary Examiner* — Hassan Kizou
*Assistant Examiner* — Hashim Bhatti
(74) *Attorney, Agent, or Firm* — Rabin & Berdo, P.C.

(57) ABSTRACT

Provided are a method of configuring a protocol header in a wireless communication system, and a communication apparatus and method using the protocol header configuration method. The protocol header may include a fixed length physical layer (PHY) header containing information associated with the number of Media Access Control (MAC) service data units, a variable length PHY header containing information associated with a segment constituting a payload, a MAC header containing information associated with the MAC service data units, and a Header Check Sequence (HCS) checking an error regarding a combination of the fixed length PHY header, the variable length PHY header, and the MAC header.

12 Claims, 5 Drawing Sheets

(56) References Cited

OTHER PUBLICATIONS

Bin A.; Ahmad A.; Afifi H.; "Securing Media Hotspots" In: IEEE Wireless Telecommunications Symposium, 2008. WTS 2008. Apr. 24, 2008. IEEE, Piscataway, NJ, USA. pp. 115-124.

"Broadband Radio Access Networks (BRAN); Hiperman; Physical (PHY) layer; ETSI TS 102 177" ETSI Standard. May 1, 2005. Lis, Sophie Antipolis Cedex, France.

\* cited by examiner

METHOD AND APPARATUS FOR CONFIGURING PROTOCOL HEADER IN WIRELESS COMMUNICATION SYSTEM

TECHNICAL FIELD

Embodiments of the present invention relate to a wireless communication system, and more particularly, to a configuration of a protocol header in the wireless communication system.

BACKGROUND ART

In a wireless communication system, a data unit may be transmitted based on a frame unit. A single frame may include a preamble, a header, a payload, and other information.

For example, in the wireless communication system where data may be transmitted at a high speed through an ultra-wideband frequency band, a Physical Layer Convergence Protocol (PLCP) Protocol Data Unit (PPDU) frame may include a PLCP preamble, a PLCP header, a PPDU payload, and an Antenna Training Sequence (ATS).

Here, the PLCP header corresponds to a protocol header. Header information included in the PLCD header may include information required to accurately decode the PPDU payload in a reception apparatus.

Accordingly, there is a need for a method that may effectively protect protocol header information.

A length of the protocol header may be variable. Accordingly, there is a need for a protocol header configuration method that may effectively protect protocol header information when the protocol header has a variable length.

DISCLOSURE OF INVENTION

Technical Goals

An aspect of the present invention provides a protocol header configuration method that may effectively protect protocol header information, and a communication method and apparatus using the protocol header configuration method.

Another aspect of the present invention also provides a protocol header configuration method that may effectively protect protocol header information, when a protocol header has a variable length.

Technical Solutions

According to an aspect of the present invention, there is provided a method and apparatus for configuring a protocol header.

In this instance, the protocol header may include a fixed length physical layer (PHY) header containing information associated with the number of Media Access Control (MAC) service data units, a variable length PHY header containing information associated with a segment constituting a payload, a MAC header containing information associated with the MAC service data units, and a Header Check Sequence (HCS) checking an error regarding a combination of the fixed length PHY header, the variable length PHY header, and the MAC header.

Also, the protocol header may further include an antenna training indicator field containing a number of antenna symbols for antenna training.

Also, the fixed length PHY header may be encoded using a first coding scheme, and the variable length PHY header, the HCS, and the MAC header may be encoded using a second coding scheme.

Also, the first coding scheme may use a repetition coding scheme.

Also, the second coding scheme may use a shortened Reed-Solomon (RS) coding scheme.

The protocol header configuration apparatus may include: a first encoder to encode the fixed length PHY header according to a first coding scheme; an HCS calculator to generate an HCS; a scrambler to scramble the MAC header and the HCS and thereby generate a scrambled MAC header and HCS; and a second encoder to encode the variable length PHY header and the scrambled MAC header and HCS according to a second coding scheme.

Advantageous Effect

According to embodiments of the present invention, a transmission apparatus may protect protocol header information of a variable length using a repetition coding scheme or a Reed-Solomon (RS) coding scheme, and may easily extract variable length header information. Through this, a reception apparatus may securely and effectively process protocol header information of the variable length.

Also, according to embodiments of the present invention, a protocol header of a fixed length may be encoded using a repetition coding scheme instead of using a shortened RS coding scheme. Through this, a reception apparatus may reduce a process latency caused by inserting zero bytes and performing RS decoding.

BEST MODE FOR CARRYING OUT THE INVENTION

Figure 1:
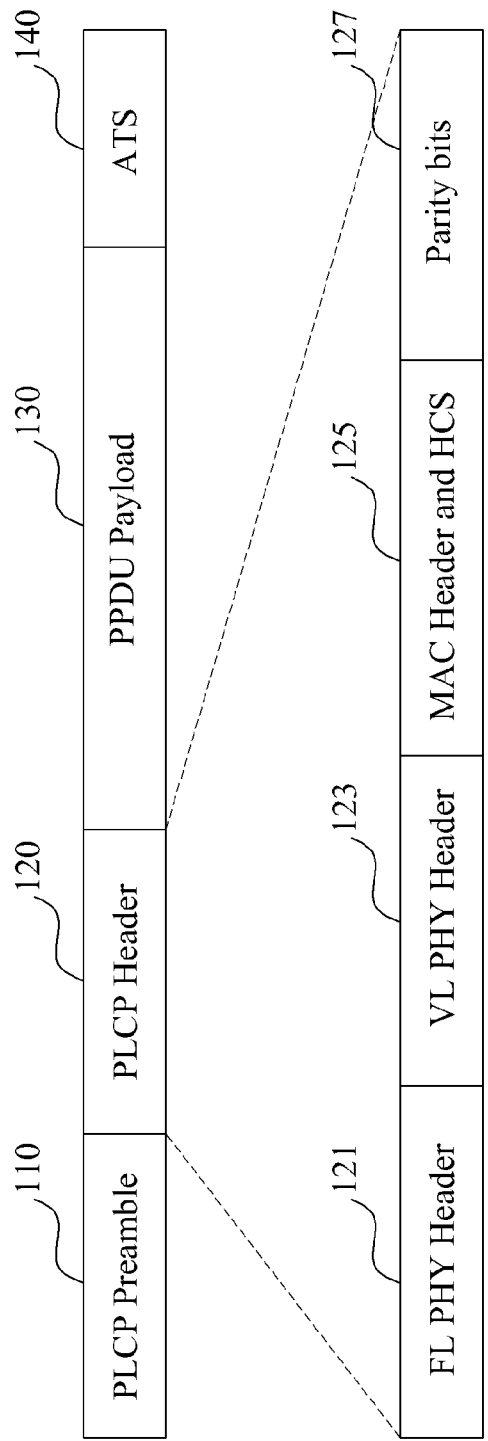
FIG. 1 illustrates a format of a Physical Layer Convergence Protocol (PLCP) Protocol Data Unit (PPDU) frame according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. When it is determined detailed description related to a known function or configuration they may render the purpose of the present invention unnecessarily ambiguous in describing the present invention, the detailed description will be omitted here.

Embodiments of the present invention may be applicable to a wireless communication system where data may be transmitted at a high speed through an ultra-wideband frequency band. However, the present invention is not limited thereto.

In the following description, a Physical Layer Convergence Protocol (PLCP) Protocol Data Unit (PPDU) may be used as an example for a protocol data unit, but the present invention is not limited thereto.

In addition, in the following description, a physical layer is referred to as "PHY layer" or "PHY", and a Media Access Control Layer is referred to as "MAC layer" or "MAC".

FIG. 1 illustrates a format of a PPDU frame according to an embodiment of the present invention.

Referring to FIG. 1, the PPDU frame may include a PLCP preamble 110, a PLCP header 120, a PPDU payload 130, and an Antenna Training Sequence (ATS) 140. Here, the PLCP header 120 denotes a field corresponding to a protocol header.

The PLCP preamble 110 may be used for a timing synchronization, a carrier offset recovery, and a channel estimation that are performed in a reception apparatus receiving the PPDU frame. Specifically, the reception apparatus may accurately perform the timing synchronization, the carrier offset recovery, and the channel estimation using the PLCP preamble 110. Here, the PLCP preamble 110 may include a frame synchronization sequence and a channel estimation sequence. According to an embodiment of the present invention, the PPDU frame may further include an antenna training indicator field (ATIF) (not shown) between a variable length (VL) PHY header 120 and a MAC header and Header Check Sequence (HCS) 125. The ATIF denotes a field to show information required for antenna training. For example, the information required for antenna training may include information associated with a number of training symbols for antenna training, and the like.

The PLCP header 120 may include information regarding a PHY and a MAC that are required to decode the PPDU payload 130. Specifically, the reception apparatus may successfully decode the PPDU payload 130 using information included in the PLCP header 120.

As shown in FIG. 1, the PLCP header 120 may include a fixed length (FL) PHY header 121, the VL PHY header 123, and the MAC header and HCS 125.

Here, FL denotes a fixed length and VL denotes a variable length. In the following description, a PHY header may be used as a meaning that includes an FL PHY header and a VL PHY header. Also, the PHY header may be used as a meaning that includes the FL PHY header, the VL PHY header, and the ATIF. The PLCP header 120 may further include parity bits 127 that are error correction codes.

The FL PHY header 121 may have the fixed length, and include length information of a MAC header. Here, length information of the MAC header may include the number of MAC service data units (MSDUs). Also, a PDU indicates a PPDU.

The VL PHY header 123 may have the variable length, and include information associated with a segment constituting the PPDU frame.

The MAC header and HCS 125 may include a MAC header and an HCS containing information associated with the MSDUs. Here, the MSDU information may include, for example, frame control information, a destination address, a source address, and sequence information associated with the MSDUs. The MSDU information may include a plurality of fields depending on whether the MSDUs are aggregated in a MAC layer. Accordingly, a length of the MAC header may be variable according to the number of MSDUs aggregated in the MAC layer.

Here, the HCS indicates information to check an error regarding a combination of the FL PHY header 121, the VL PHY header 123, and the MAC header. For example, the HCS may include a Consultative Committee on International Telephone and Telegraphy (CCITT) Cyclic Redundancy Check (CRC)-16 HCS.

The parity bits 127 may include information associated with the PPDU frame or error correction with respect to encoding of the PPDU frame.

The PPDU payload 130 may include at least one segment that may be transmitted to the reception apparatus.

The ATS 140 may include information for antenna training between a transmission apparatus transmitting the PPDU frame, and the reception apparatus.

Here, antenna training indicates a process of exchanging an antenna parameter and the like to maximize a link performance between communication apparatuses. Generally, a communication apparatus performing antenna training may select a sector or adjust a transmit and receive beam pattern through the above antenna training process.

Figure 2:
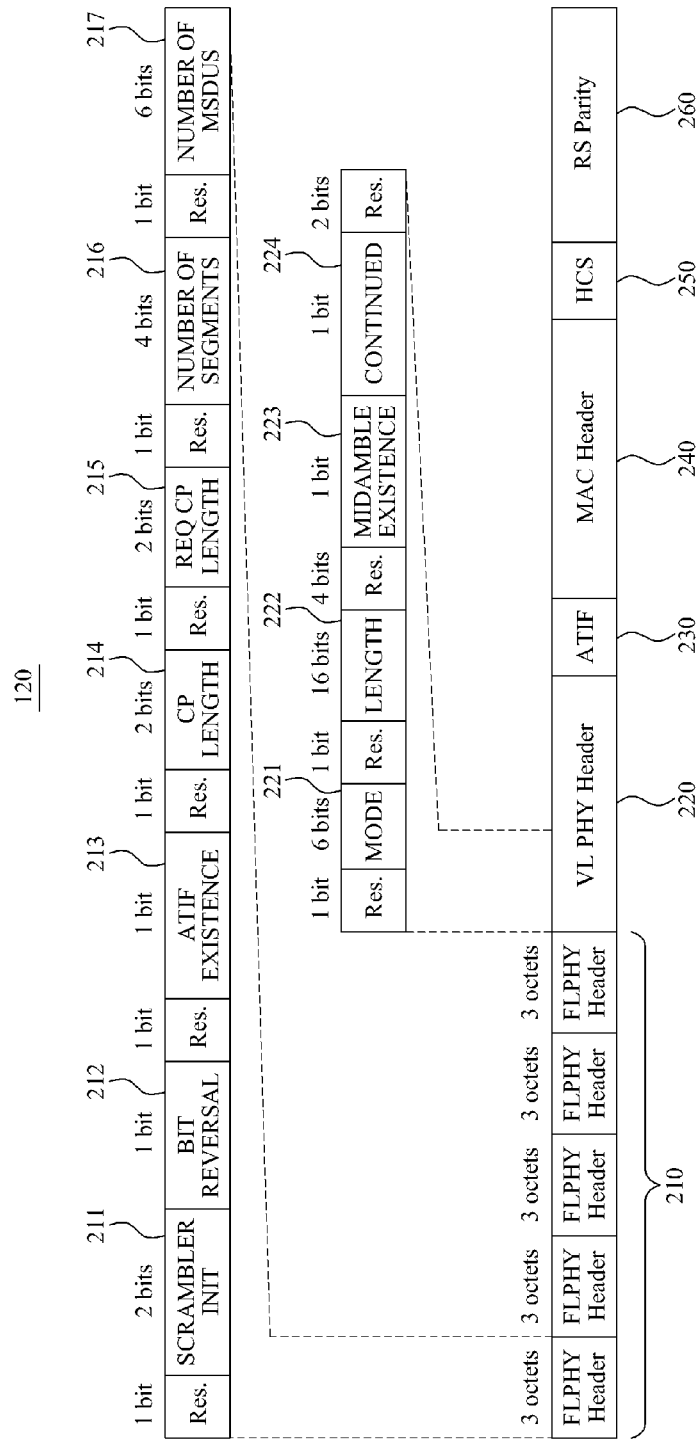
FIG. 2 illustrates an example of a PLCP header of FIG. 1.

FIG. 2 illustrates an example of the PLCP header 120 of FIG. 1.

Referring to FIG. 2, the PLCP header 120 may include an FL PHY header 210, a VL PHY header 220, an ATIF 230, a MAC header 240, an HCS 250, and an RS parity 260.

In FIG. 2, "Res." indicates a reserved field to include additional information as necessary. Also, in FIG. 2, the VL PHY header 220, the MAC header 240, the HCS 250, and the RS parity 260 may include the same information as information described above with reference to FIG. 1.

Here, the ATIF 230 may include a number of training symbols for antenna training. The ATIF 230 may further include additional information required for antenna training.

Referring to FIG. 2, the FL PHY header 210 may include five repetition FL PHY headers that are generated using a repetition coding scheme. Each of the five FL PHY headers may include 3 octets.

Also, each of the FL PHY headers may include SCRAMBLER INIT 211 indicating a scrambler seed value, BIT REVERSAL 212 indicating whether to perform a bit reversal with respect to a payload when using an on-off keying (OOK) modulation scheme, ATIF EXISTENCE 213 indicating whether an ATIF field exists between a VL PHY header and a MAC header, CP LENGTH 214 indicating a cyclic prefix (CP) length of a current frame, REQ CP LENGTH 215 indicating a CP length of a following frame, NUMBER OF SEGMENTS 216 indicating a number of segments within a protocol data unit frame, and NUMBER OF MSDUS 217 indicating a number of MSDUs included in the frame. The number of MSDUs indicates the number of MSDUs aggregated in a MAC layer of a communication apparatus. Accordingly, when a value of the NUMBER OF MSDUS 217 is "1", it corresponds to a case where only a single MSDU exists, and thus a length of the MAC header is indicated as 10 bytes. When the value of the NUMBER OF MSDUS 217 is N greater than 1 where N=2, 3, . . . , n, it corresponds to a case where N MSDUs are aggregated, and thus the length of the MAC header is indicated as 10+4×N bytes.

The VL PHY header 220 may be repeated as many times as the number of segments included in the protocol data unit frame. The VL PHY header 220 may include MODE 221 indicating a modulation scheme of a corresponding segment and a coding scheme thereof, LENGTH 222 indicating a length of a payload in the corresponding segment, MIDAMBLE EXISTENCE 223 indicating whether a midamble exists at the end of the corresponding segment, and CONTINUED 224 indicating whether the corresponding segment is fragmented.

Figure 3:
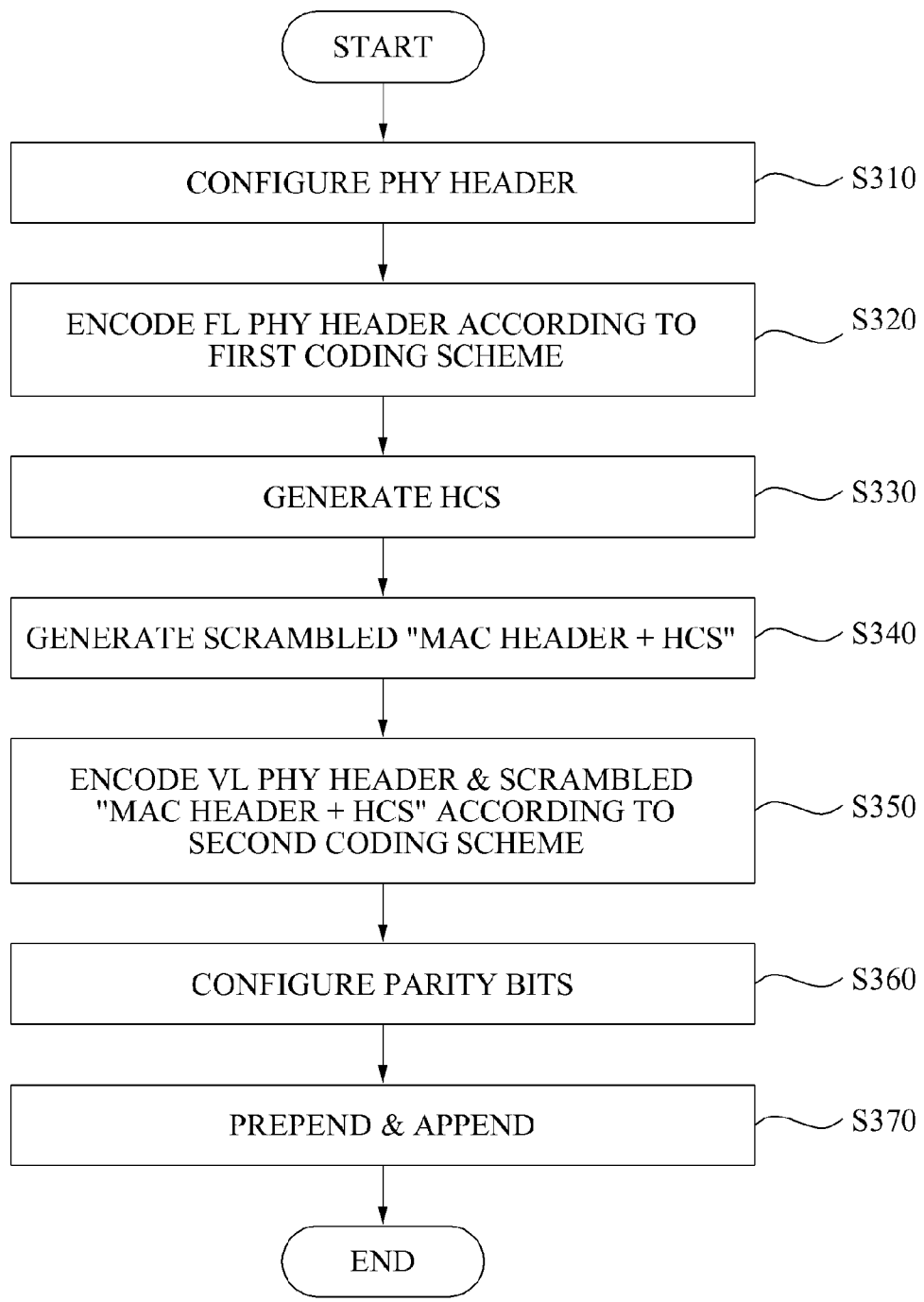
FIG. 3 is a flowchart illustrating a method of configuring a protocol header according to an embodiment of the present invention.

FIG. 3 is a flowchart illustrating a method of configuring a protocol header according to an embodiment of the present invention.

The protocol header configuration method of FIG. 3 may be applicable to configure the protocol header of FIG. 1 or FIG. 2.

The protocol header configuration method of FIG. 3 may be performed by a communication apparatus of a wireless communication system where data may be transmitted at a high speed through an ultra-wideband frequency band. The communication apparatus may perform the protocol header configuration method, or may include a processor to control the protocol header configuration method. Here, the communication apparatus may be classified into any one of three types. For example, a communication apparatus of a type A may support antenna training and a communication distance thereof is about 10 meters. A communication apparatus of a type B may not support antenna training, and a communication distance thereof is about five meters. A communication apparatus of a type C may support only a master-slave operation and a communication apparatus thereof is about 2 meters.

Referring to FIG. 3, in operation S310, the communication apparatus may configure a PHY header that includes an FL PHY header and a VL PHY header.

Here, the FL PHY header and the VL PHY header may be provided in the format of FIG. 2. Information to configure the FL PHY header and the VL PHY header may be provided from a MAC layer corresponding to an upper layer to a PHY layer.

In operation S320, the communication apparatus may encode the FL PHY header according to a first coding scheme. The first coding scheme may use a repetition coding scheme or a fixed sized codeword RS coding scheme.

In operation S330, the communication apparatus may generate an HCS to check an error regarding a combination of the FL PHY header, the VL PHY header, and a MAC header.

Here, it is assumed that the MAC header is configured in advance prior to generating of the HCS.

The communication apparatus may calculate the HCS using a PHY header and the MAC header, and append the calculated HCS value to the MAC header. For ease of description, the MAC header with the appended HCS value is represented by "MAC header+HCS".

In operation S340, the communication apparatus may scramble "MAC header+HCS" to generate scrambled "MAC header+HCS". Here, scrambling indicates a process of encoding input data by applying a predetermined scramble code to the input data.

In operation S350, the communication apparatus may encode the VL PHY header and the scrambled "MAC header+HCS" according to a second coding scheme. Here, the second coding scheme may use a shortened RS coding scheme. When an ATIF exists, the communication apparatus may encode the VL PHY header, the ATIF, and "MAC header+HCS" according to the second coding scheme.

In operation S360, the communication apparatus may configure parity bits for error correction with respect to the second coding scheme. Here, the parity bits may be calculated using the VL PHY header, the MAC header, and the HCS.

In operation S370, the communication apparatus may prepend the FL PHY header and append the parity bits to thereby complete a scrambled and shortened RS encoded PLCP header.

Specifically, in operation S370, the communication apparatus may prepend the FL PHY header encoded according to the first coding scheme to the VL PHY header that is encoded according to the second coding scheme, and append the parity bits to "MAC header+HCS" that is encoded according to the second coding scheme.

According to an embodiment of the present invention, a protocol header configuration method may indicate, in an FL PHY header, the number of MSDUs aggregated in a MAC layer. Also, the protocol header configuration method may include length information of a VL header in the FL PHY header, and independently encode the FL PHY header. Accordingly, a reception apparatus may easily extract the VL header information and may also securely and effectively process protocol header information of the VL.

The shortened RS coding scheme may use RS(255, 239) as a mother code. When the entire protocol header is encoded using the shortened RS coding scheme, the entire protocol header length (hereinafter, referred to as a frame header length) is generally less than 239 bytes and thus zero bytes corresponding to "239 bytes—frame header length" may be added behind information bytes. Here, the zero bytes may be eliminated before parity bits are generated and are transmitted to a reception apparatus.

Accordingly, to perform RS decoding for a protocol header of a VL, the transmission apparatus may need to be aware of a number of zero bytes used in a transmission apparatus. When the reception apparatus is unaware of the number of zero bytes used in the transmission apparatus, the reception apparatus may not effectively perform RS decoding.

Figure 4:
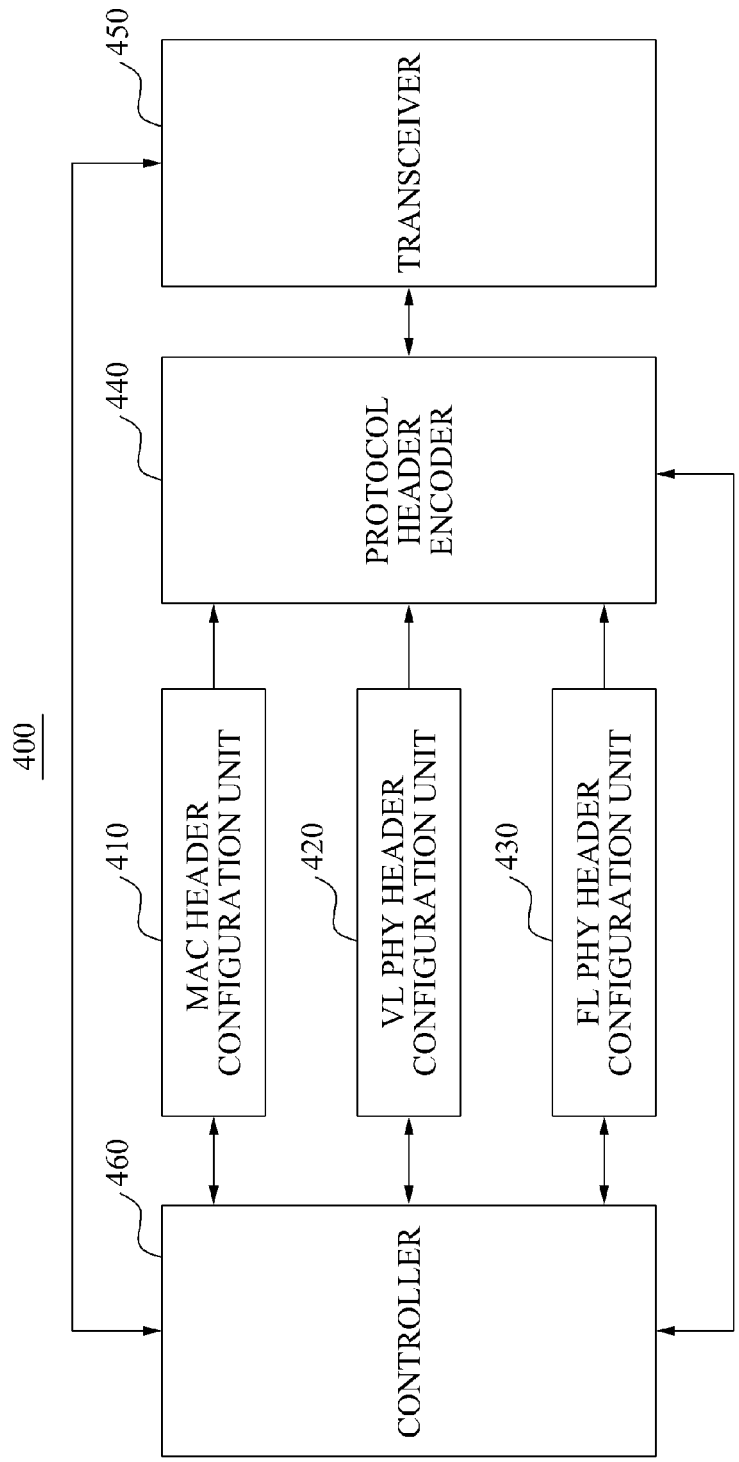
FIG. 4 is a block diagram illustrating a configuration of a communication apparatus according to an embodiment of the present invention.

FIG. 4 is a block diagram illustrating a configuration of a communication apparatus 400 according to an embodiment of the present invention.

Referring to FIG. 4, the communication apparatus 400 may include a MAC header configuration unit 410, a VL PHY header configuration unit 420, an FL PHY header configuration unit 430, a protocol header encoder 440, a transceiver 450, and a controller 460.

The MAC header configuration unit 410 may configure a MAC header as shown in FIGS. 1 through 3. The MAC header configuration unit 410 may manage a MAC layer of the communication apparatus 400.

The VL PHY header configuration unit 420 may configure a VL PHY header as shown in FIGS. 1 through 3.

The FL PHY header configuration unit 430 may configure an FL PHY header as shown in FIGS. 1 through 3.

The VL PHY header configuration unit 420 and the FL PHY header configuration unit 430 may manage a PHY layer of the communication apparatus 400.

The protocol header encoder 440 may calculate an HCS value to thereby generate an HCS, and encode a protocol header. The protocol header encoder 440 may encode the FL PHY header according to a first coding scheme, and may encode the VL PHY header and "MAC header+HCS" according to a second coding scheme.

The transceiver 450 may transmit the protocol header and a PPDU frame to a reception apparatus, or may receive data from the reception apparatus.

The controller 460 may control general operations of the communication apparatus 400. Specifically, the controller 460 may control operations of the MAC header configuration unit 410, the VL PHY header configuration unit 420, the FL PHY header configuration unit 430, the protocol header encoder 440, and the transceiver 450.

Figure 5:
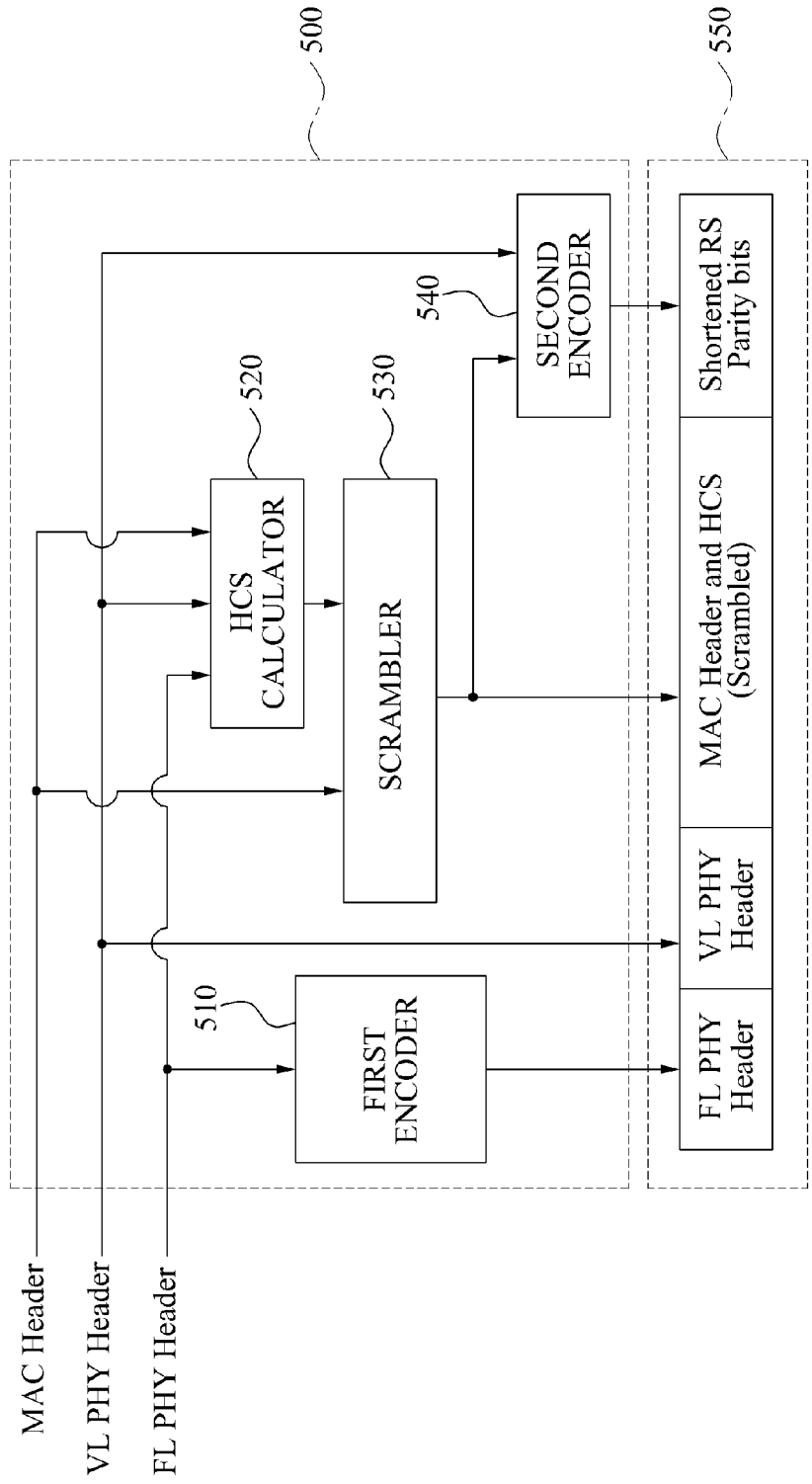
FIG. 5 is a block diagram illustrating a configuration of a protocol header encoding apparatus according to an embodiment of the present invention.

FIG. 5 is a block diagram illustrating a configuration of a protocol header encoding apparatus 500 according to an embodiment of the present invention.

The protocol header encoding apparatus 500 may be applicable to the protocol header encoder 440 of FIG. 4.

Referring to FIG. 5, the protocol header encoding apparatus 500 may include a first encoder 510, an HCS calculator 520, a scrambler 530, and a second encoder 540.

The first encoder 510 may encode a VL PHY header according to a first coding scheme. Here, the first coding scheme may use a repetition coding scheme or a general RS coding scheme.

The repetition coding scheme corresponds to an information protection scheme that may reduce a transmission error by repeating bits to be transmitted via a channel. The general RS coding scheme may use an RS code of RS(n, 3) when a length of an FL PHY header includes three bytes. Here, n denotes an integer greater than 3.

A number of repetitions of the repetition coding scheme may be determined as a value greater than or equal to 2, but may generally have an odd number.

The HCS calculator 520 may calculate 2 bytes of an HCS value from a combination of the VL PHY header and a MAC header to thereby generate an HCS. The HCS calculator 520 may calculate the HCS value by including the FL PHY header, the VL PHY header, and the MAC header.

The scrambler 530 may append the HCS to the MAC header and scramble the MAC header and the HCS. The scrambler 530 may encode input data by applying a predetermined scramble code to the input data.

The second encoder 540 may apply a second coding scheme to the VL PHY header and the scrambled "MAC header+HCS". The second coding scheme may use a shortened RS coding scheme. Specifically, the second encoder 540 may apply the shortened RS coding scheme to the VL PHY header and the scrambled "MAC header+HCS". When an ATIF is followed by the VL PHY header, the second encoder 540 may apply the second coding scheme to the VL PHY header, the ATFI, and the scrambled "MAC header+HCS".

The second encoder 540 may append, to the scrambled "MAC header+HCS", parity bits that are calculated using the MAC header and the HCS.

A finally completed PLCP header 550 may include the FL PHY header that is encoded according to a channel coding scheme such as the repetition coding scheme or the RS coding scheme, the VL PHY header and the scrambled "MAC header+HCS" that are encoded according to the second coding scheme, and the parity bits.

The protocol header configuration method according to the above-described exemplary embodiments of the present invention may be recorded in computer-readable media including program instructions to implement various operations embodied by a computer. The media may also include, alone or in combination with the program instructions, data files, data structures, and the like.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A method of configuring a protocol header associated with a plurality of Media Access Control (MAC) service data units and a payload, the method comprising:
    configuring a fixed length physical layer (PHY) header of the protocol header to contain a length information of the MAC service data units (MSDUs);
    configuring a variable length PHY header of the protocol header to contain information of the payload;
    configuring a MAC header of the protocol header to contain MSDU information associated with the MAC service data units; and
    generating a Header Check Sequence (HCS) for checking an error regarding a combination of the fixed length PHY header, the variable length PHY header, and the MAC header, wherein
    the fixed length PHY header is encoded using a first coding scheme, and
    the variable length PHY header, the HCS, and the MAC header are encoded using a second coding scheme.

2. The method of claim 1, further comprising configuring an antenna training indicator field containing a number of antenna symbols for antenna training.

3. The method of claim 1, wherein the MAC header has a variable length based on the length information of MAC service data units.

4. The method of claim 1, wherein the first coding scheme includes a repetition coding scheme.

5. The method of claim 1, wherein the second coding scheme includes a shortened Reed-Solomon (RS) coding scheme.

6. An apparatus for configuring a protocol header associated with a plurality of Media Access Control (MAC) service data units and a payload, the apparatus comprising:
    a first encoder that encodes a fixed length physical layer (PHY) header of the protocol header to contain a length information of the MAC service data units (MSDUs);
    a second encoder that encodes a variable length PHY header of the protocol header to contain information of the payload;
    a MAC header configuration unit that configures a MAC header of the protocol header to contain MSDU information associated with the MAC service data units; and
    a Header Check Sequence (HCS) calculator that checks an error regarding a combination of the fixed length PHY header, the variable length PHY header, and the MAC header, wherein
    the first encoder encodes the fixed length PHY header using a first coding scheme, and
    the second encoder encodes the variable length PHY header, the HCS, and the MAC header using a second coding scheme.

7. The apparatus of claim 6, wherein the second encoder is operable to configure an antenna training indicator field containing a number of antenna symbols for antenna training.

8. The apparatus of claim 6, wherein the MAC header has a variable length based on the length information of MAC service data units.

9. The apparatus of claim 6, wherein the first coding scheme includes a repetition coding scheme.

10. The apparatus of claim 6, wherein the second coding scheme includes a shortened RS coding scheme.

11. The apparatus of claim 6, wherein the HCS calculator generates an HCS, the apparatus further comprises a scrambler to scramble the MAC header and the HCS to thereby generate a scrambled MAC header and HCS, the second encoder encoding the variable length PHY header and the scrambled MAC header and HCS according to a second coding scheme.

12. The apparatus of claim 11, wherein the second encoder encodes the scrambled MAC header and HCS, and an antenna training indicator field according to the second coding scheme.

* * * * *